United States Patent
Maruno et al.

(10) Patent No.: US 11,821,463 B2
(45) Date of Patent: Nov. 21, 2023

(54) ROTARY MACHINING DEVICE, METHOD OF MANUFACTURING HUB UNIT BEARING AND METHOD OF MANUFACTURING VEHICLE

(71) Applicant: NSK LTD., Tokyo (JP)

(72) Inventors: Tetsurou Maruno, Fujisawa (JP); Satoshi Sugai, Hanyu (JP); Hiroaki Yamazaki, Tokyo (JP); Nobuyuki Hagiwara, Fujisawa (JP)

(73) Assignee: NSK LTD., Tokyo (JP)

( * ) Notice: Subject to any disclaimer, the term of this patent is extended or adjusted under 35 U.S.C. 154(b) by 366 days.

(21) Appl. No.: 16/975,232

(22) PCT Filed: Feb. 25, 2019

(86) PCT No.: PCT/JP2019/007031
§ 371 (c)(1),
(2) Date: Aug. 24, 2020

(87) PCT Pub. No.: WO2019/163986
PCT Pub. Date: Aug. 29, 2019

(65) Prior Publication Data
US 2020/0408250 A1    Dec. 31, 2020

(30) Foreign Application Priority Data

Feb. 26, 2018   (JP) ................. 2018-032487
Mar. 22, 2018   (JP) ................. 2018-054018
Feb. 5, 2019    (JP) ................. 2019-018458

(51) Int. Cl.
*B21K 1/40*     (2006.01)
*B21K 25/00*    (2006.01)
(Continued)

(52) U.S. Cl.
CPC ............ *F16C 19/186* (2013.01); *B21D 53/10* (2013.01); *B21D 53/26* (2013.01); *B21K 1/05* (2013.01);
(Continued)

(58) Field of Classification Search
CPC .... B21J 9/025; B21J 9/06; B21K 1/40; B21K 25/00; B60B 2310/2082; B23D 53/10; B23P 11/005
See application file for complete search history.

(56) References Cited

U.S. PATENT DOCUMENTS 3,703,823 A    11/1972   Wilson
5,435,414 A    7/1995    Barrett
(Continued)

FOREIGN PATENT DOCUMENTS

CN    2134900 Y      6/1993
CN    102381139 A    3/2012
(Continued)

OTHER PUBLICATIONS

International Search Report for PCT/JP2019/006990 dated May 14, 2019.
(Continued)

*Primary Examiner* — Christopher J Besler
(74) *Attorney, Agent, or Firm* — Sughrue Mion, PLLC (57) ABSTRACT

Provided are an oil receiver (20) having an annular recess portion (52) which faces an entire circumference of an outer circumferential edge of a concave spherical portion (36), and a guide member (21) which guides lubricating oil, which has flowed out from a spherical engagement portion between a convex spherical portion (24) and a concave spherical portion (36), toward an annular recess portion (52).

8 Claims, 8 Drawing Sheets

(51) Int. Cl.
- *B23P 11/00* (2006.01)
- *B21J 9/02* (2006.01)
- *B21J 9/06* (2006.01)
- *F16C 19/18* (2006.01)
- *B60B 27/00* (2006.01)
- *B21D 53/26* (2006.01)
- *B23P 17/00* (2006.01)
- *B21K 1/05* (2006.01)
- *B21D 53/10* (2006.01)
- *F16C 43/04* (2006.01)

(52) U.S. Cl.
CPC ............... *B21K 1/40* (2013.01); *B21K 25/00* (2013.01); *B23P 11/005* (2013.01); *B23P 17/00* (2013.01); *B60B 27/0084* (2013.01); *B21J 9/025* (2013.01); *B21J 9/06* (2013.01); *B60B 2380/12* (2013.01); *F16C 43/04* (2013.01); *F16C 2226/52* (2013.01); *F16C 2326/02* (2013.01)

(56) References Cited

U.S. PATENT DOCUMENTS

| | | | |
|---|---|---|---|
| 2002/0038563 | A1 | 4/2002 | Steinmetz et al. |
| 2005/0018937 | A1* | 1/2005 | Lagorgette .......... B60B 27/0084 29/898.07 |
| 2017/0209914 | A1 | 7/2017 | Hagiwara et al. |
| 2018/0202495 | A1 | 7/2018 | Hagiwara et al. |

FOREIGN PATENT DOCUMENTS

| | | |
|---|---|---|
| CN | 102667147 A | 9/2012 |
| CN | 104100826 A | 10/2014 |
| CN | 105531050 A | 4/2016 |
| CN | 107709806 A | 2/2018 |
| CN | 107735193 A | 2/2018 |
| GB | 319065 A | 9/1929 |
| JP | 50-048841 U | 5/1975 |
| JP | 57-007343 A | 1/1982 |
| JP | 60-250836 A | 12/1985 |
| JP | 2-251330 A | 10/1990 |
| JP | 4-200947 A | 7/1992 |
| JP | 6-285576 A | 10/1994 |
| JP | 7-251232 A | 10/1995 |
| JP | 2001-241450 A | 9/2001 |
| JP | 2005-172049 A | 6/2005 |
| JP | 2013-091067 A | 5/2013 |
| JP | 2014-133254 A | 7/2014 |
| JP | 2016-165735 A | 9/2016 |
| WO | 2004/001247 A1 | 12/2003 |
| WO | 2016/013668 A1 | 1/2016 |
| WO | 2017/010481 A1 | 1/2017 |

OTHER PUBLICATIONS

International Search Report for PCT/JP2019/007031 dated May 14, 2019.
European Search Report for 19757158.1 dated May 19, 2020.
European Search Report for 19756844.7 dated May 26, 2020.
Office Action dated Mar. 9, 2022 in U.S. Appl. No. 16/975,212.
Communication dated Dec. 2, 2021 from the China National Intellectual Property Administration in Chinese Application No. 201980015204.3.
Search Report dated Sep. 15, 2021 from The State Intellectual Property Office of the P.R. of China in Application No. 2019800152467.
Office Action dated Jan. 12, 2023 issued by the United States Patent and Trademark Office in U.S. Appl. No. 16/975,212.
Communication dated Jan. 17, 2023, issued in Japanese Application No. 2019-165540.

* cited by examiner

ROTARY MACHINING DEVICE, METHOD OF MANUFACTURING HUB UNIT BEARING AND METHOD OF MANUFACTURING VEHICLE

CROSS-REFERENCE TO RELATED APPLICATIONS

This application is a National Stage of International Application PCT/JP2019/007031 filed Feb. 25, 2019, claiming priority based on Japanese Patent Application No. 2018-032487, filed Feb. 26, 2018, Japanese Patent Application No. 2018-054018, filed Mar. 22, 2018, and Japanese Patent Application No. 2019-018458, filed Feb. 5, 2019.

FIELD OF THE INVENTION

The present invention relates to a rotary machining device which can be used, for example, to form a caulking portion formed by plastically deforming a cylindrical portion provided at an axial end portion of a shaft member outward in a radial direction.

BACKGROUND ART

Figure 7:
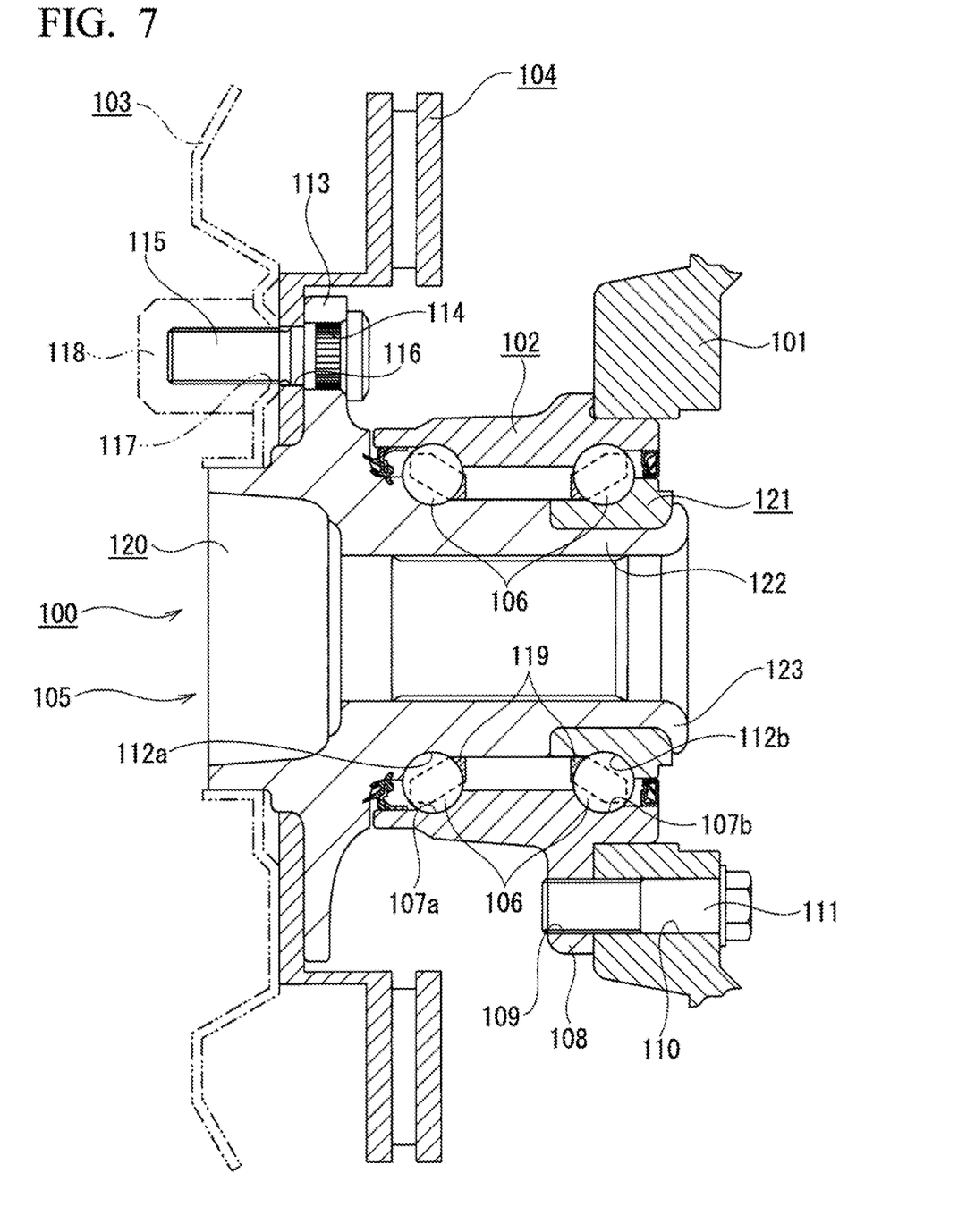
FIG. 7 is a cross-sectional view showing an example of a conventionally known wheel support rolling bearing unit.

As shown in FIG. 7, for example, vehicle wheels of a vehicle are rotatably supported by a hub unit bearing 100 with respect to a suspension device.

The hub unit bearing 100 includes an outer race 102 which is coupled and fixed to a knuckle 101 constituting a suspension device in use and does not rotate, a hub 105 to which a wheel 103 constituting a vehicle wheel in use and a braking rotation body 104 including a disk, a drum and the like are supported and fixed and which rotates together with the wheel 103 and the braking rotation body 104, and a plurality of rolling elements 106.

The outer race 102 includes double rows of outer race tracks 107a and 107b and a stationary flange 108. The double rows of outer race tracks 107a and 107b are formed on an inner circumferential surface of an axially intermediate portion of the outer race 102. The stationary flange 108 is formed at the axially intermediate portion of the outer race 102 to protrude outward in the radial direction and has support holes 109 which are screw holes at a plurality of positions in the circumferential direction. The outer race 102 is coupled and fixed to the knuckle 101 by a bolt 111 inserted through a through hole 110 formed in the knuckle 101 being screwed into the support hole 109 of the stationary flange 108 from the inside in the axial direction and then further tightened.

The hub 105 is disposed radially inward from the outer race 102 to be coaxial with the outer race 102 and includes double rows of inner race tracks 112a and 112b and a rotation flange 113. The double rows of inner race tracks 112a and 112b are formed on portions of an outer circumferential surface of the hub 105 which face the double rows of outer race tracks 107a and 107b. The rotation flange 113 is formed to protrude radially outward at a portion of the hub 105 which is located axially outside an axially outer end portion of the outer race 102, and has mounting holes 114 at a plurality of positions in the circumferential direction. The braking rotation body 104 is coupled and fixed to the rotation flange 113 of the hub 105 by a serration portion formed in a proximal end portion of a stud 115 being pressed into the mounting hole 114 of the rotation flange 113 and an intermediate portion of the stud 115 being pressed into the through hole 116 formed in the braking rotation body 104. Moreover, a vehicle wheel is coupled and fixed to the rotation flange 113 by inserting a male screw portion formed at a tip end portion of the stud 115 through a through hole 117 formed in the wheel 103 and then screwing the nut 118 onto the male screw portion and further tightening the nut 118.

The rolling elements 106 are disposed to be rollable between the double rows of outer race tracks 107a and 107b and the double rows of inner race tracks 112a and 112b in a state in which the plurality of rolling elements are held by a holding tool 119 for each row.

In the example shown, the hub 105 is constituted by coupling and fixing a hub main body 120 having the inner race track 112a on the outside in the axial direction (the left side in FIG. 7) and an inner race 121 having the inner race track 112b on the inside in the axial direction (the right side in FIG. 7) to each other. Specifically, the hub main body 120 and the inner race 121 are coupled and fixed to each other by a caulking portion 123 formed by plastically deforming an axially inner end portion of a cylindrical portion 122 provided at the axially inner end portion of the hub main body 120 outward in the radial direction in a state in which the inner race 121 is externally fitted to a portion of the hub main body 120 in the vicinity of an axially inner end portion thereof.

Figure 8:
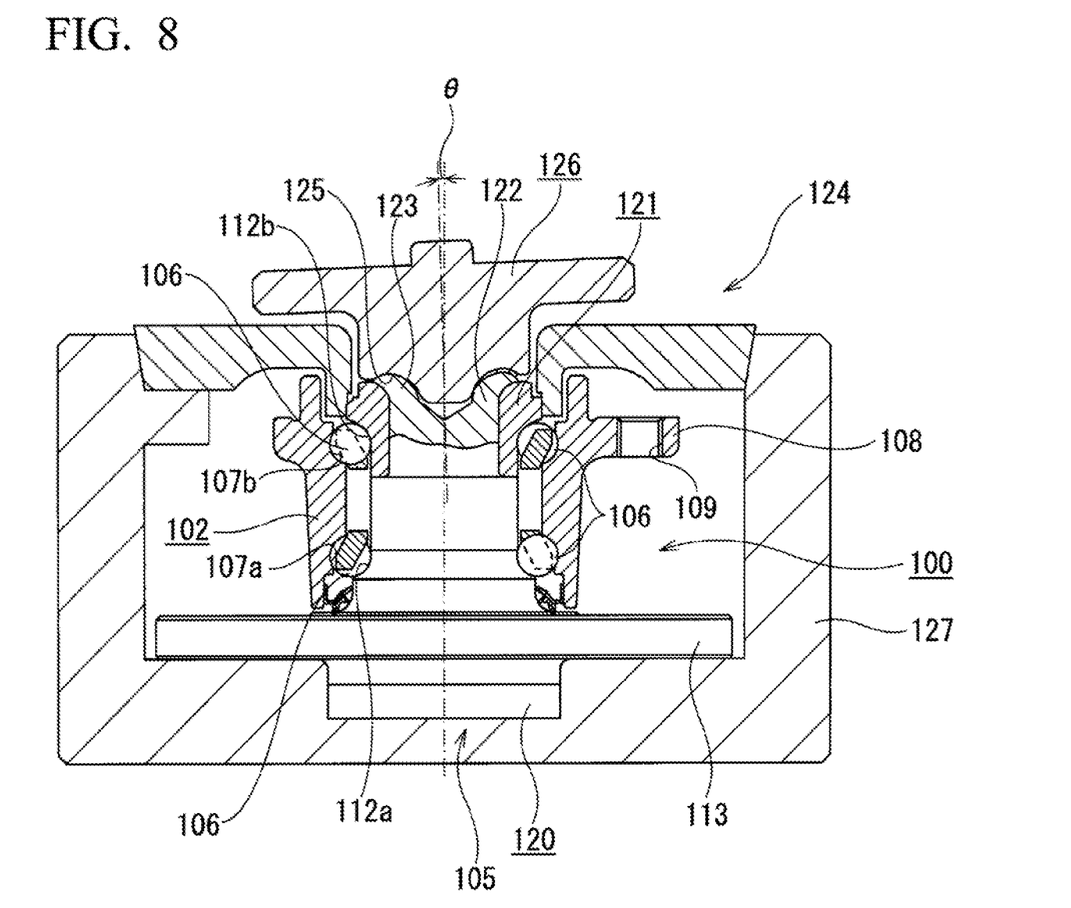
FIG. 8 is a cross-sectional view showing an example of a conventional structure of a rotary machining device (a rotary forging device).

When the axially inner end portion of the cylindrical portion 122 of the hub main body 120 is plastically deformed (caulked and expanded) radially outward to form the caulking portion 123, for example, a rotary caulking device (a rotary forging device) which is a type of rotary machining device can be used. FIG. 8 shows a rotary caulking device 124 described in Japanese Patent Application, Publication No. 2001-241450.

The rotary caulking device 124 includes a pressing die 126 having a machining portion 125 at a tip end portion (a lower end portion in FIG. 8), and a holder 127 which supports the hub main body 120 so that a central axis of the hub main body 120 is directed vertically. When the axially inner end portion of the cylindrical portion 122 is caulked and expanded to form the caulking portion 123, the pressing die 126 is swingably rotated by an actuator while the hub main body 120 is pressed upward through the holder 127. That is, in a state in which a central axis of the pressing die 126 is inclined by a predetermined angle θ with respect to the central axis of the hub main body 120, the pressing die 126 is rotated about the central axis of the hub main body 120. In other words, the central axis of the pressing die 126 is rotated around the central axis of the hub main body 120 like the trajectory of the central axis caused by the precession motion.

When the caulking portion 123 is formed by the rotary caulking performed using the rotary caulking device 124, a part of the pressing die 126 in the circumferential direction presses the axial inner end portion of the cylindrical portion 9, and the machining operation for the caulking portion 123 proceeds partially and continuously in the circumferential direction. Therefore, according to the rotary caulking, a load required for the machining can be reduced as compared to the case in which the caulking portion 123 is formed by a general forging press.

CITATION LIST

Patent Document

[Patent Document 1]
Japanese Patent Application, Publication No. 2001-241450
[Patent Document 2]
Japanese Patent Application, Publication No. 2013-91067
[Patent Document 3]
PCT International Publication No. WO2004/001247

SUMMARY OF INVENTION

Technical Problem

However, in the rotary caulking device 124 as described above, a large machining reaction force is applied to the pressing die 126 in the axial direction during the machining of the caulking portion 123. On the other hand, in Japanese Patent Application, Publication No. 2013-132678, although it is not intended to form the caulking portion at the axially inner end portion of the hub main body of the hub unit bearing, a structure of a rotary forging device in which a machining reaction force applied to a pressing die (an upper die) at the time of rotary forging can be supported by spherically engaging a convex spherical portion (a hemispherical portion) having a partially convex spherical shape with a concave spherical portion (a receiving surface) having a partially concave spherical shape is disclosed.

In the rotary forging device disclosed in Japanese Patent Application, Publication No. 2013-132678, since the central axis of the pressing die is inclined at only a predetermined angle with respect to the central axis of the concave spherical portion, a part of the concave spherical portion is exposed from the convex spherical portion. Therefore, a spherical engagement portion may be forcibly lubricated, and the lubricating oil which has flowed (leaked) radially outward from the spherical engagement portion may drip down from the concave spherical portion and may adversely affect an environment around a workpiece.

In PCT International Publication No. WO2004/001247, a rotary caulking device in which formation of an indentation impression on the inner race track and the outer race track can be prevented by rotating the outer race and rotating and revolving the rolling elements during the machining of the caulking portion is described.

An object of the present invention is to realize a structure of a rotary machining device which is capable of reducing an influence on a surrounding environment, for example, preventing lubricating oil having flowed out of a spherical engagement portion between a convex spherical portion and a concave spherical portion from adversely affecting an environment around a workpiece and is thus advantageous for appropriate environmental protection against a swinging motion.

Solution to Problem

In one aspect of the present invention, a rotary machining device includes a reference axis, a support jig, a shall-equipped spherical seat, a concave spherical seat, an oil receiver, and a guide member. The support jig serves to support a workpiece such that a central axis of the workpiece and the reference axis are coaxial with each other. The shaft-equipped spherical seat includes a machining portion having a central axis inclined with respect to the reference axis and formed at one axial end portion, and a convex spherical portion having a partially spherical shape, formed at an axially intermediate portion and facing the other axial end side. The concave spherical seat includes an insertion hole through which the other axial end portion (a portion of the shaft-equipped spherical seat located on the other axial end side of the convex spherical portion) of the shaft-equipped spherical seat is inserted, and a concave spherical portion which spherically engages with the convex spherical portion. The oil receiver has an annular recess portion which faces the entire circumference of an outer circumferential edge of the concave spherical portion. The other axial end portion (a base end portion) of the guide member is supported by a portion of the shaft-equipped spherical seat on one axial end side. The guide member serves to guide lubricating oil, which has flowed out from a spherical engagement portion between the convex spherical portion and the concave spherical portion, toward the annular recess portion.

In one aspect of the present invention, a hub unit bearing to be manufactured through a method of manufacturing a hub unit bearing includes an outer race having double rows of outer race tracks on an inner circumferential surface thereof, a hub having double rows of inner race tracks on an outer circumferential surface thereof, and a plurality of rolling elements rollably disposed for each row between the double rows of outer race tracks and the double rows of inner race tracks. The hub includes inner races and a hub main body. Each of the inner races has an inner race track on the inside in the axial direction, among the double rows of inner race tracks, on an outer circumferential surface thereof. The hub main body includes an inner race track on the axial outside, among the double rows of inner race tracks, which is provided directly or via another member on an outer circumferential surface of the axially intermediate portion, a fitting cylindrical portion which is provided axially inward from the inner race track on the axially outside and on which the inner race is externally fitted, and a caulking portion which is bent radially outward from an axially inner end portion of the fitting cylindrical portion and presses an axially inner end surface of the inner race.

In the method of manufacturing the hub unit bearing according to one aspect of the present invention, the caulking portion is formed by plastically deforming the cylindrical portion provided at an axially inner end portion of the hub main body before formation of the caulking portion radially outward using the above-described rotary machining device.

In one aspect of the present invention, a vehicle to be manufactured through a method of manufacturing a vehicle includes a hub unit bearing. In the method of manufacturing a vehicle, the hub unit bearing is manufactured through the method of manufacturing a hub unit bearing as described above.

Advantageous Effects of Invention

According to the above-described rotary machining device of the present invention, it is possible to reduce an influence on a surrounding environment, for example, to prevent lubricating oil having flowed out from a spherical engagement portion between a convex spherical portion and a concave spherical portion from adversely affecting an environment around a workpiece. Further, the rotary machining device of the present invention is advantageous for appropriate environmental protection against a rotary motion.

DESCRIPTION OF EMBODIMENTS

First Example of Embodiment

Figure 1:
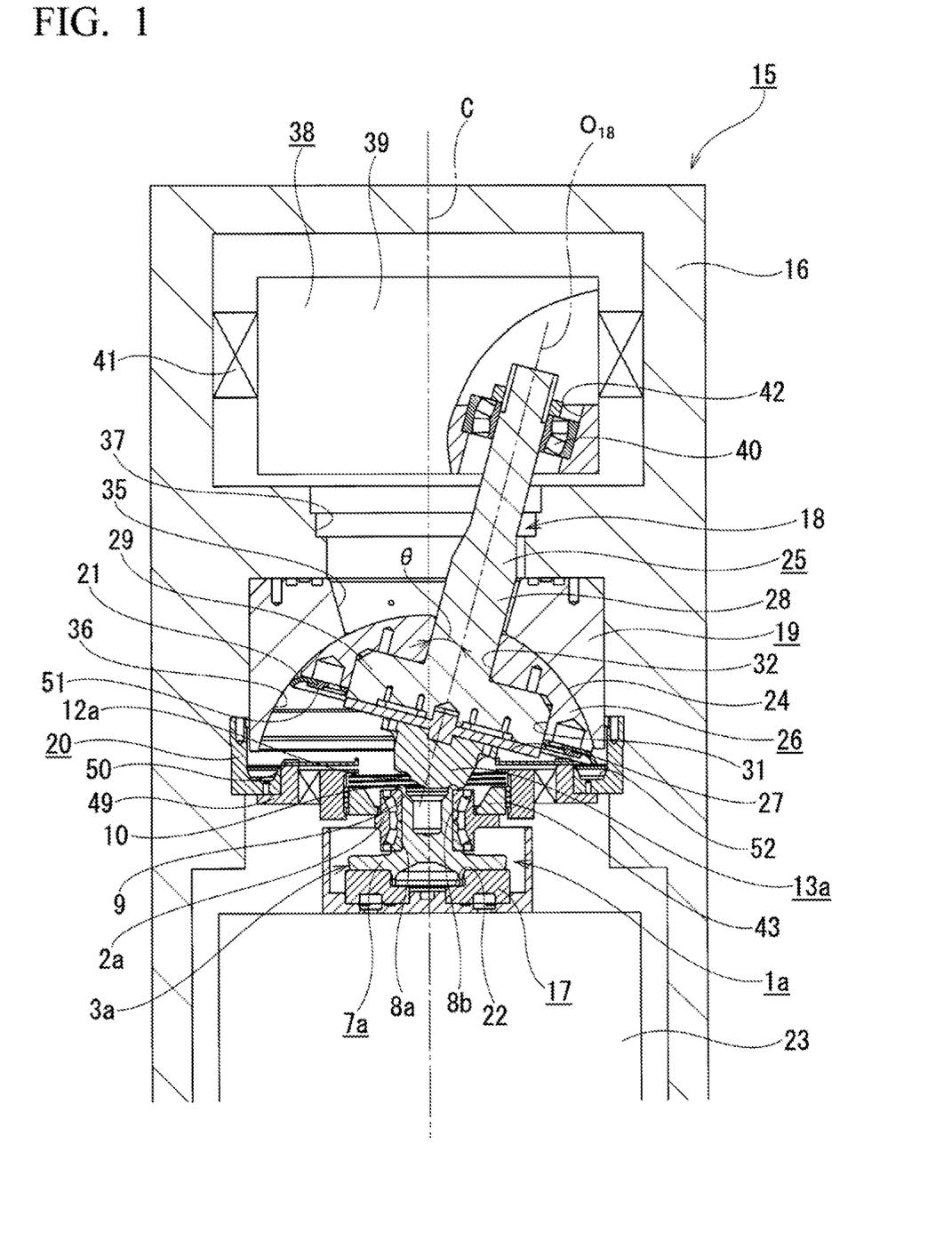
FIG. 1 is a schematic cross-sectional view showing a rotary machining device (a rotary forging device) according to a first example of an embodiment of the present invention.
Figure 2:
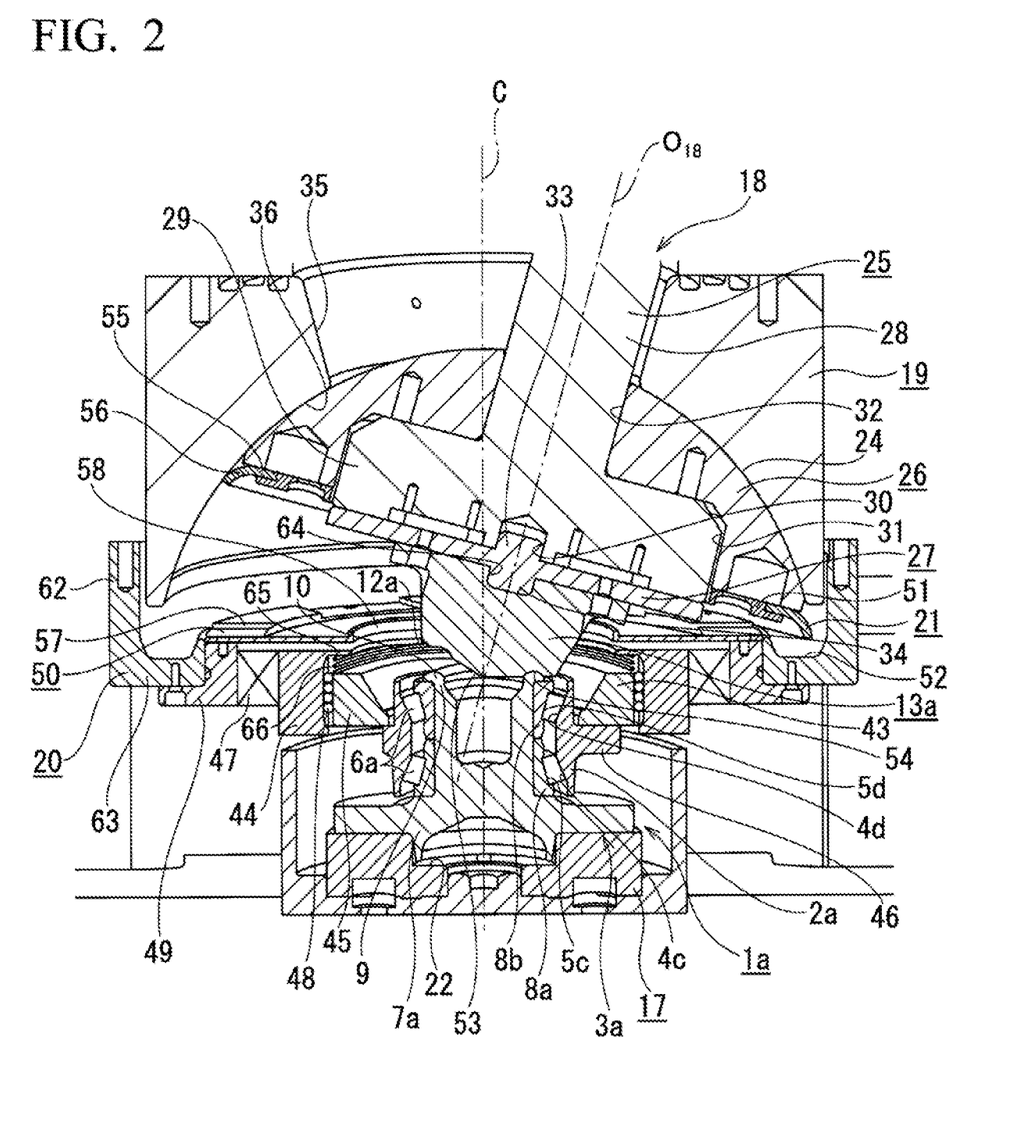
FIG. 2 is an enlarged cross-sectional view of a main part of FIG. 1.
Figure 3:
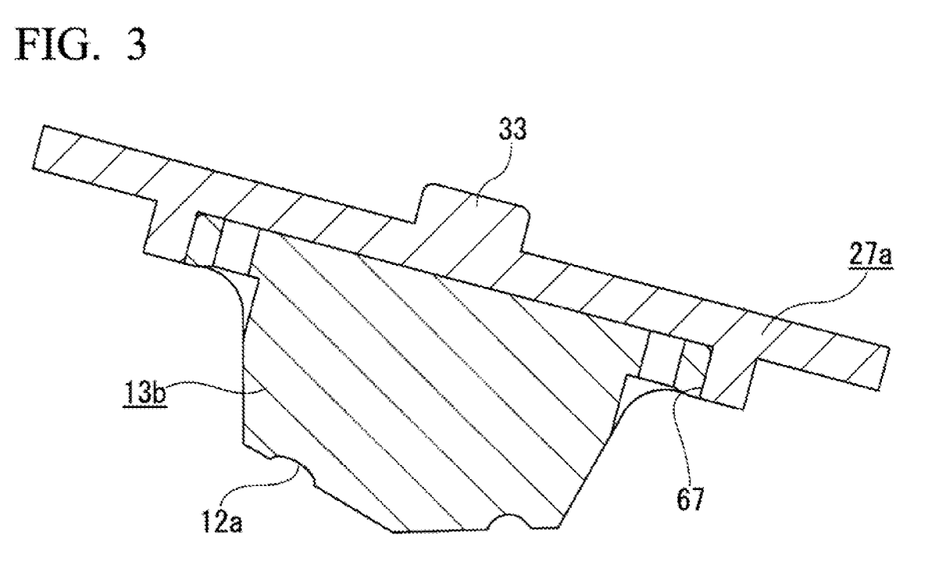
FIG. 3 is a cross-sectional view showing another example of a coupling structure between a base plate and a pressing die.

FIGS. 1 and 2 show a first example of an embodiment of the present invention. A rotary machining device 15 of this example is a rotary forging device and is used for rotary caulking which forms a caulking portion 10 by plastically deforming (caulking and expanding) an axially inner end portion of a cylindrical portion 9 of a hub main body 7a while crushing the axially inner end portion axially outward so that it is pressed and expanded radially outward.

In this example, a hub 3a of a hub unit bearing 1a which is a workpiece is constituted by externally fitting a pair of inner races 8a and 8b to an outer circumferential surface of an axially intermediate portion of the hub main body 7a and then pressing an axially inner end surface of the inner race 8b on the axial inside by the caulking portion 10 formed by radially outwardly plastically deforming the axially inner end portion of the cylindrical portion 9a provided at an axially inner end portion of the hub main body 7a. However, like the hub unit bearing 100 shown in FIG. 7, the hub unit bearing 1a which is an object of the embodiment may also be constituted by a hub main body having an outer race track on the outside in the axial direction, and one inner race on an outer circumferential surface of an axially intermediate portion.

Further, in the hub unit bearing 1a, tapered rollers are used as rolling elements 6a, but balls may also be used as in the hub unit bearing 100 shown in FIG. 7.

Regarding the hub unit bearing 1a, the inner side in the axial direction is the center side of a vehicle in the width direction in a state in which the hub unit bearing 1a is assembled to a suspension device. On the other hand, the outer side of the vehicle in the width direction in a state in which the hub unit bearing 1a is assembled to the suspension device is referred to as the outside in the axial direction.

The rotary forging device 15 of this example includes a frame 16 which is mounted on a floor of a factory or the like and is not displaced during an operation of the rotary forging device 15, a support jig (a support body) 17, a shaft-equipped spherical seat (a swinging body) 18, a concave spherical seat 19, a drive mechanism 38, an outer race rotating mechanism 43, an oil receiver 20, a guide member 21, and a cover ring (a cover plate) 50. Further, the rotary forging device 15 also has a reference axis C which is a reference of machining. In this example, the reference axis C is directed in the vertical direction and is disposed at a central portion of the rotary forging device 15.

The support jig 17 supports the hub unit bearing (a workpiece, an object to be machined) 1a so that a central axis of the hub unit bearing 1a is coaxial with the reference axis C, an axially outer end portion of the hub unit bearing 1a is directed downward and an axially inner end portion thereof is directed upward. That is, the support jig 17 has a support recess portion 22, which can be engaged with (fitted to) an axially outer end portion of the hub main body 7a without rattling in the radial direction, on an upper surface thereof. Such a support jig 17 is supported by an upper end portion of a lifting table 23 installed to be movable up and down along the reference axis C at a lower portion inside the frame 16.

The shaft-equipped spherical seat 18 includes a machining portion 12a having a central axis $O_{18}$ inclined with respect to the reference axis C and formed at one axial end portion (a lower end portion in FIGS. 1 and 2), and a convex spherical portion 24 having a partially spherical shape, formed at an axially intermediate portion and facing the other axial end side (the upper side in FIGS. 1 and 2). The shaft-equipped spherical seat (the swinging body) 18 is disposed to face a surface of the support jig 17 which intersects a predetermined axis and swingably rotates with respect to the workpiece (the object to be machined) 1a. For example, the predetermined axis is the reference axis C.

In addition, regarding the shaft-equipped spherical seat 18, the one axial end side is the tip end portion side on which the machining portion 12a is formed, that is, is referred to as the lower side of FIGS. 1 and 2, and the other axial end side is the side opposite to the tip end portion on which the machining portion 12a is formed, that is, is referred to as the upper side in FIGS. 1 and 2.

An inclination angle θ of the central axis $O_{18}$ of the shaft-equipped spherical seat 18 with respect to the reference axis C is preferably 15 degrees or more and 45 degrees or less, more preferably 15 degrees or more and 30 degrees or less, most preferably 15 degrees or more and 18 degrees or less. For example, the inclination angle θ may be 5, 10, 12, 14, 16, 18, 20, 25, 30, 35, 40, or 45 degrees. In this example, the inclination angle θ is 15 degrees. A force in a direction in which the cylindrical portion 9 is pressed outward in the axial direction and a force in a direction in which the cylindrical portion 9 is pressed and expanded outward in the radial direction can be adjusted to appropriate magnitudes and a surface roughness of a portion of an outer circumferential surface of the cylindrical portion 9 which is in contact with (fitted to) an inner circumferential surface of the inner race 8b can be made favorable by setting the inclination angle θ to 15 degrees or more, and thus durability of the hub unit bearing 1a can be improved. Further, in the case in which the inclination angle θ is set to 30 degrees or less, a wear amount of the caulking portion 10 can be minimized to a low level when the caulking portion 10 is formed by rotary caulking, and the durability of the hub unit bearing 1a can be improved. The inclination angle θ may be less than 15 degrees or more than 45 degrees. When the hub unit bearing 1a is manufactured using the rotary forging device of the present invention, the inclination angle θ is preferably 15 degrees or more and 18 degrees or less in terms of structure.

In this example, the shaft-equipped spherical seat (the swinging body) 18 is constituted by combining a shaft main body 25, a convex spherical seat 26, a base plate 27, and a pressing die (a machining tool) 13*a*.

The shaft main body 25 includes a shaft portion 28, a flange portion 29 which protrudes radially outward from an outer circumferential surface of one axial end portion of the shaft portion 28, and a first positioning recess portion 30 which is formed at a central portion of one axial end surface.

The convex spherical seat 26 includes a convex spherical portion 24 which is formed on a side surface on the other axial end portion side, a fitting recess portion 31 which is formed on a side surface on the one axial end side, and a through hole 32. The fitting recess portion 31 is formed so that the flange portion 29 of the shaft main body 25 is internally fitted thereto without rattling in the radial direction. The through hole 32 is formed to pass through a central portion of the convex spherical seat 26 in the axial direction and also formed so that an axially intermediate portion of the shaft portion 28 of the shaft main body 25 (a portion adjacent to the other axial end side of a portion in which the flange portion 29 is formed) can be inserted therethrough without rattling in the radial direction.

The base plate 27 includes a first positioning convex portion 33 which is formed on a side surface on the other axial end side and can be fitted to the first positioning recess portion 30 of the shaft main body 25 without rattling in the radial direction, and a second positioning convex portion 34 which is formed on a side surface on one axial end side.

The pressing die (the machining tool, the swinging body) 13*a* includes the machining portion 12*a* which is formed at the one axial end portion, and a second positioning recess portion 64 which is formed on a side surface on the other axial end side and can be fitted to the second positioning convex portion 34 of the base plate 27 without rattling in the radial direction. That is, the machining portion 12*a* is constituted by forming a conical protruding portion 53 on a central portion of a side surface of the pressing die 13*a* on the one axial end side and forming a recess groove 54 having a circular arc shape in cross section around the protruding portion 53 to surround the entire circumference of the protruding portion 53. The pressing die (the machining tool, the swinging body) 13*a* is disposed to face a surface of the support jig 17 which intersects a predetermined axis, and swingably rotates with respect to the workpiece (the object to be machined) 1*a*.

The shaft main body 25 and the convex spherical seat 26 are combined by inserting or press-fitting the axially intermediate portion of the shaft portion 28 into the through hole 32 without rattling in the radial direction and internally fitting the flange portion 29 into the fitting recess portion 31 without rattling in the radial direction. Further, the base plate 27 and the pressing die (the machining tool) 13*a* are coupled and fixed to each other by internally fitting the second positioning convex portion 34 of the base plate 27 into the second positioning recess portion 64 of the pressing die 13*a* without rattling in the radial direction, screwing a bolt inserted through a circular hole formed in the pressing die 13*a* into a screw hole formed in the base plate 27, and the like. In this example, the shaft-equipped spherical seat 18 is constituted by concavo-convex engagement between an assembly of the shaft main body 25 which is a main body and the convex spherical seat 26 and an assembly of the base plate 27 and the pressing die 13*a* and between the first positioning recess portion 30 and the first positioning convex portion 33 and also by a coupling member such as a bolt.

Figure 5:
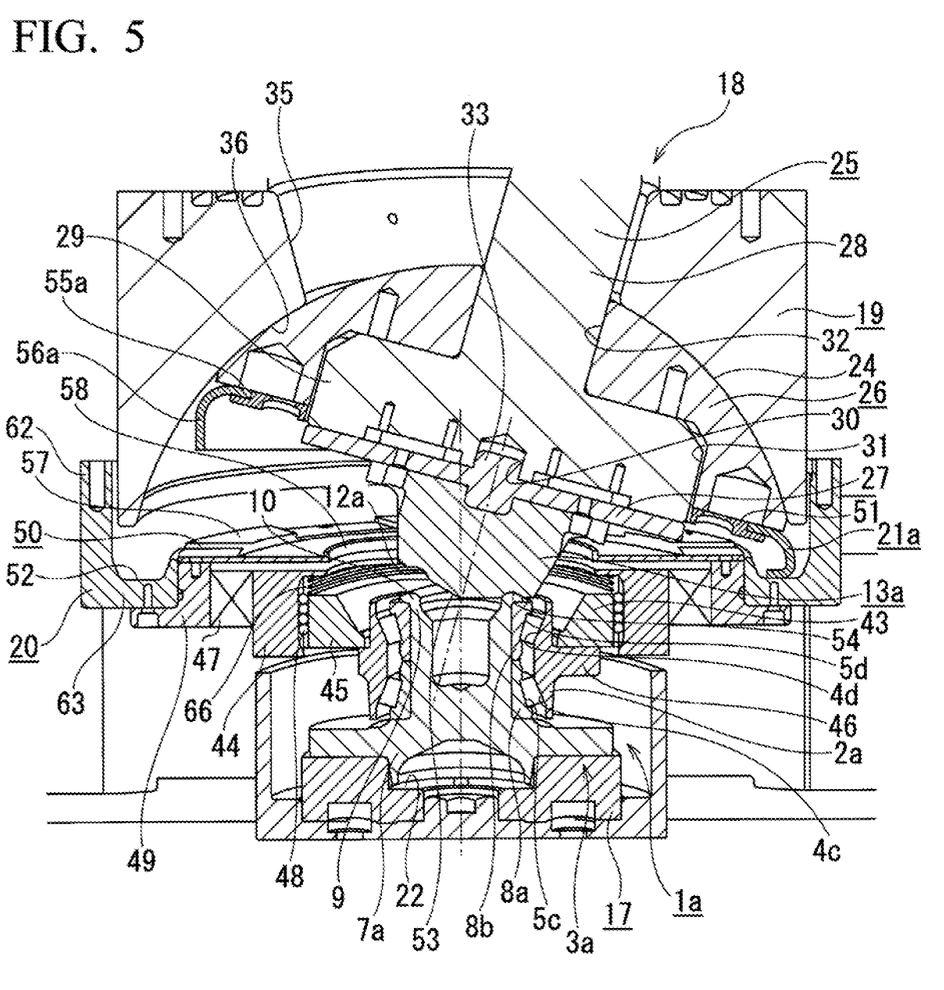
FIG. 5 is an enlarged cross-sectional view of a main part showing a rotary machining device (a rotary forging device) according to a second example of the embodiment of the present invention.

However, as shown in FIG. 5, a base plate 27*a* and the pressing die (the machining tool) 13*b* may be coupled and fixed to each other by internally fitting a base end portion (the other axial end portion, an upper end portion in FIG. 5) of the pressing die 13*b* into a holding recess portion 67 formed in a side surface of the base plate 27*a* on the one axial end side without rattling and screwing a bolt inserted through a circular hole formed in the pressing die 13*b* into a screw hole formed in the base plate 27*a*. Further, a method of coupling and fixing the shaft main body 25, the convex spherical seat 26, the base plate 27; 27*a* and the pressing die 13*a*; 13*b* is not limited to the method using a bolt, and for example, the coupling and fixing may be performed by press-fitting or a snap ring. Also, some of the shaft main body 25, the convex spherical seat 26, the base plate 27 and the pressing die 13*a* may be integrally formed, or the entire shaft-equipped spherical seat 18 may be integrally formed.

The concave spherical seat 19 includes an insertion hole 35 for inserting the axially intermediate portion (a portion of the shall portion 28 of the shaft main body 25 which protrudes from the convex spherical portion 24 of the convex spherical seat 26 toward the other axial end side) of the shaft-equipped spherical seat 18, and a concave spherical portion 36 which has a partially spherical shape and spherically engages with the convex spherical portion 24 of the shaft-equipped spherical seat 18. In this example, the concave spherical seat 19 is supported by and fixed to a vertically intermediate portion in the frame 16.

In this example, due to the spherical engagement between the convex spherical portion 24 of the shaft-equipped spherical seat 18 and the concave spherical portion 36 of the concave spherical seat 19, a swinging motion (rotation, revolution) of the spherical seat 18 equipped with shaft about the reference axis C and a posture change (a rotational motion, rotation) of the shaft-equipped spherical seat 18 about the own central axis $O_{18}$ thereof are allowed, and also, when the rotary forging is performed, the machining reaction force applied to the shaft-equipped spherical seat 18 can be supported. During the operation of the rotary forging device 15, that is, while the shaft-equipped spherical seat 18 swingably rotates around the reference axis C by the drive mechanism 38 which will be described later, the spherical engagement portion between the convex spherical portion 24 and the concave spherical portion 36 is forcibly lubricated by lubricating oil discharged from a plurality of discharge port nozzles formed in the concave spherical portion 36.

In this example, the insertion hole 35 of the concave spherical seat 19 is a tapered hole of which an inner diameter dimension increases as it goes upward. Further, a portion of the frame 16 which is adjacent to the upper side of the insertion hole 35 of the concave spherical seat 19 and through which the axially intermediate portion of the shaft-equipped spherical seat 18 is inserted is a stepped hole 37 of which an inner diameter dimension gradually increases as it goes upward. The inner diameters of the insertion hole 35 and the stepped hole 37 are regulated so that inner circumferential surfaces of the insertion hole 35 and the stepped hole 37 do not interfere with an outer circumferential surface of the shaft-equipped spherical seat 18 when the shaft-equipped spherical seat 18 swingably rotates about the reference axis C.

In this example, the reason why the portion of the frame 16 adjacent to the upper side of the insertion hole 35 of the concave spherical seat 19 is the stepped hole 37 is to facilitate the machining. When the present invention is implemented, the portion of the frame 16 adjacent to the upper side of the insertion hole 35 of the concave spherical seat 19 may be a tapered hole of which an inner diameter dimension increases as it goes upward.

The drive mechanism 38 serves to apply a driving force which causes the shaft-equipped spherical seat 18 to swingably rotate about the reference axis C with respect to the other axial end portion of the shaft-equipped spherical seat 18. The drive mechanism 38 is supported by and fixed to an upper end portion inside the frame 16 and is also connected to the other axial end portion of the shaft portion 28 of the shaft main body 25 of the shaft-equipped spherical seat 18, which protrudes upward from the stepped hole 37, to be able to apply a driving force.

The drive mechanism 38 includes a rotation body 39 and a bearing 40. The rotation body 39 is supported by the upper end portion in the frame 16 via a bearing device 41 to allow only rotation about the reference axis C. Further, the rotation body 39 has a holding hole 42, which is inclined outward in the radial direction as it goes upward, at one position of the radially intermediate portion in the circumferential direction. An inclination angle of a central axis of the holding hole 42 with respect to the reference axis C is the same as the inclination angle θ of the central axis $O_{18}$ of the shaft-equipped spherical seat 18 with respect to the reference axis C. Furthermore, an output portion of a motor (not shown) for rotationally driving the rotation body 39 about the reference axis C is connected to the rotation body 39 directly or via a reduction gear.

The bearing 40 is provided between an inner circumferential surface of the holding hole 42 and an outer circumferential surface of the other axial end portion of the shaft-equipped spherical seat 18 and rotatably supports the other axial end portion of the shaft-equipped spherical seat 18 with respect to the holding hole 42. In this example, an automatic aligning roller bearing is used as the bearing 40. Alternatively, a rolling bearing such as a deep groove ball bearing and an angular ball bearing may be used, as long as it can support a radial load and an axial load.

As the rolling elements 6a are rotated and revolved by rotating the outer race 2a of the hub unit bearing 1a and thus the caulking portion 10 is formed, the outer race rotating mechanism 43 serves to prevent formation of an indentation impression on the outer race tracks 4c and 4d and the inner race tracks 5c and 5d. The outer race rotating mechanism 43 includes an electric motor (not shown), a driving ring 44 which is rotationally driven by the electric motor, and a driving jig 45 which is supported to slightly movable up and down with respect to the driving ring 44 and to be rotatable in synchronization with the driving ring 44. Specifically, in the illustrated example, the driving ring 44 and the driving jig 45 are combined via a ball spline 48. An inward flange portion 65 which protrudes inward in the radial direction is provided at an upper end portion of the driving ring 44, and a torsion coil spring 66 is sandwiched between a lower surface of the inward flange portion 65 and an upper end surface of the driving jig 45. With such a constitution, the driving jig 45 is supported to be displaced in the vertical direction with respect to the driving ring 44, and thus a lower end portion of the driving jig 45 can be coupled to a coupling flange 46 of the outer race 2a. The outer race rotating mechanism 43 is constituted to be able to rotationally drive the outer race 2a by rotationally driving the driving jig 45 engaged with the coupling flange 46 of the outer race 2a with the electric motor via the driving ring 44. The driving ring 44 is rotatably supported on the frame 16 via a radial bearing 47, a guide ring 49 having an L shape in section and a generally annular shape, and an oil receiver 20. However, the outer race rotating mechanism 43 is not limited to the above-described constitution and may adopt various constitutions as long as the rolling element 6a can be rotated and revolved by rotationally driving the outer race 2a.

The oil receiver 20 includes a cylindrical portion 62 which is formed to have a substantially L shape in section and supported and fixed around the other axial end portion (the lower end portion) of the concave spherical seat 19, and an annular portion 63 which is bent radially inward from a lower end portion of the cylindrical portion 62. The annular portion 63 has, in an upper surface thereof, an annular recess portion 52 facing the entire circumference of an outer circumferential edge of the concave spherical portion 36 of the concave spherical seat 19. Most of lubricating oil which has lubricated the spherical engagement portion between the convex spherical portion 24 of the shaft-equipped spherical seat 18 and the concave spherical portion 36 of the concave spherical seat 19 and then has flowed out (has leaked out) from an outer circumferential edge portion of this spherical portion moves downward along the concave spherical portion 36 and drops from the outer circumferential edge portion of the concave spherical portion 36 into the annular recess portion 52. The lubricating oil dropped into the annular recess portion 52 is recovered from an oil passing hole (not shown) formed in the oil receiver 20 and is supplied again to the spherical engagement portion between the convex spherical portion 24 and the concave spherical portion 36 from a discharge port formed in the concave spherical portion 36 through a lubricating oil flow path.

The entire guide member 21 is formed in a tubular shape, and a diameter thereof increases toward the one axial end portion (the tip end portion). For example, the guide member 21 is formed of rubber or another material. A conical tubular portion 56 and an annular portion 55 which is bent radially inward from the other axial end portion (the base end portion) of the tubular portion 56 are provided.

The guide member 21 supports and fixes a radially inner end portion of the annular portion 55 to a side surface of the convex spherical seat 26 of the shaft-equipped spherical seat 18 on the one axial end side via an annular support ring 51. That is, the radially inner end portion of the annular portion 55 is coupled and fixed to a radially outer end portion of the support ring 51 by adhesion or the like, and the support ring 51 is also fixed to a side surface of the convex spherical seat 26 on one axial end side by screwing or the like.

Further, the guide member 21 slidably contacts an outer circumferential surface of one axial end portion (a tip end portion) of a portion (a portion inclined to the upper side, a left portion in FIGS. 1 and 2) of the tubular portion 56 in the circumferential direction with the concave spherical portion 36 of the concave spherical seat 19 and causes one axial end edge (a tip edge) of the remaining part (a portion inclined to the lower side, a right portion in FIGS. 1 and 2) of the tubular portion 56 to face an opening portion of the annular recess portion 52 of the oil receiver 20. As described later, when the caulking portion 10 is formed, a sliding position of an outer circumferential surface of the tip end portion of the tubular portion 56 with respect to the concave spherical portion 36 moves in the circumferential direction centering on the central axis $O_{18}$ of the shaft-equipped spherical seat 18 according to rotation and revolution (swingy rotation) of the shaft-equipped spherical seat 18.

The cover ring (the cover plate) 50 includes an annular cover portion 57, and a return portion 58 which is bent upward from a radially inner end portion of the cover portion 57. The cover portion 57 fixes the radially outer end portion to an upper end portion of the guide ring 49 by screwing or the like and also covers upper end portions of the outer race rotating mechanism 43 and the radial bearing 47 using a radially inner portion thereof.

The cover ring 50 is formed so that the lubricating oil flows down into the annular recess portion 52 of the oil receiver 20 even when the lubricating oil that has flowed out from the spherical engagement portion between the convex spherical portion 24 and the concave spherical portion 36 falls on an upper surface of the cover portion 57. Specifically, the cover portion 57 is slightly inclined in the downward direction as it goes radially outward.

When the caulking portion 10 is formed at the axially inner end portion of the hub main body 7a by the rotary forging device 15 of this example, first, in a state in which the hub main body 7a before the caulking portion 10 is formed and the other parts constituting the hub unit bearing 1a are assembled, the hub main body 7a is supported by the support jig 17 without rattling in the radial direction so that a center axis of the hub main body 7a is coaxial with the reference axis C, the axially outer end portion of the hub unit bearing 1a is directed downward and the axially inner end portion thereof is directed upward.

Then, by moving the lifting table 23 upward, a part of the recess groove 54 of the machining portion 12a of the shaft-equipped spherical seat 18 in the circumferential direction is pressed against a part of the axially inner end portion of the cylindrical portion 9 provided at the axially inner end portion of the hub main body 7a in the circumferential direction. At the same time, the driving jig 45 is engaged with the coupling flange 46 of the outer race 2a.

Next, the shaft-equipped spherical seat 18 is swingably rotated about the reference axis C based on the rotation of the rotation body 39 about the reference axis C. At this time, the shaft-equipped spherical seat 18 rotates (rotates on its axis) about its own central axis $O_{18}$ on the basis of a frictional force acting on the contact portion between the recess groove 54 of the machining portion 12a and the axially inner end portion of the cylindrical portion 9. Further, at this time, the spherical engagement portion between the convex spherical portion 24 and the concave spherical portion 36 is forcibly lubricated by the lubricating oil discharged from a plurality of discharge ports formed in the concave spherical portion 36. When the shaft-equipped spherical seat 18 is swingably rotated, while a load directed axially outward and radially outward is applied to a portion of the cylindrical portion 9 in the circumferential direction, a portion to which the load is applied is continuously changed in the circumferential direction, thus the axially inner end portion of the cylindrical portion 9 is gradually plastically deformed, and the caulking portion 10 is formed. In particular, when the oscillation angle (the inclination angle θ) of the shaft-equipped spherical seat 18 at the time of forming the caulking portion 10 by the rotary forging is set to 15 degrees or more (30 degrees or less), a maximum machining load at the time of performing the rotary forging can be suppressed to be low.

The rotary forging device 15 of the example includes the guide member 21. Thus, it is possible to prevent the lubricating oil which has flowed out from the outer circumferential edge portion of the spherical engagement portion between the convex spherical portion 24 and the concave spherical portion 36 from falling down and adversely affecting the environment around the hub unit bearing 1a during machining of the caulking portion 10.

That is, the lubricating oil which has leaked out from the outer circumferential edge portion of the spherical engagement portion between the convex spherical portion 24 and the concave spherical portion 36 is blocked by a portion of the outer circumferential surface of the tubular portion 56 of the guide member 21 which is slidably in contact with the concave spherical portion 36. In this way, the blocked lubricating oil moves downward along the outer circumferential surface of the tubular portion 56 by the action of gravity and then drops into the annular recess portion 52. Alternatively, a portion of the tubular portion 56 which blocks the lubricating oil is displaced downward according to the swingy rotation (the revolution) and the rotation of the shaft-equipped spherical seat 18, and when the engagement with the concave spherical portion 36 is released (when it does not slide), the lubricating oil falls from the outer circumferential edge portion of the tubular portion 56 into the annular recess portion 52. As a result, the environment around the hub unit bearing 1a can be prevented from being adversely affected. Also, a recovery rate of the lubricating oil can be improved, and cost can be reduced.

Figure 4:
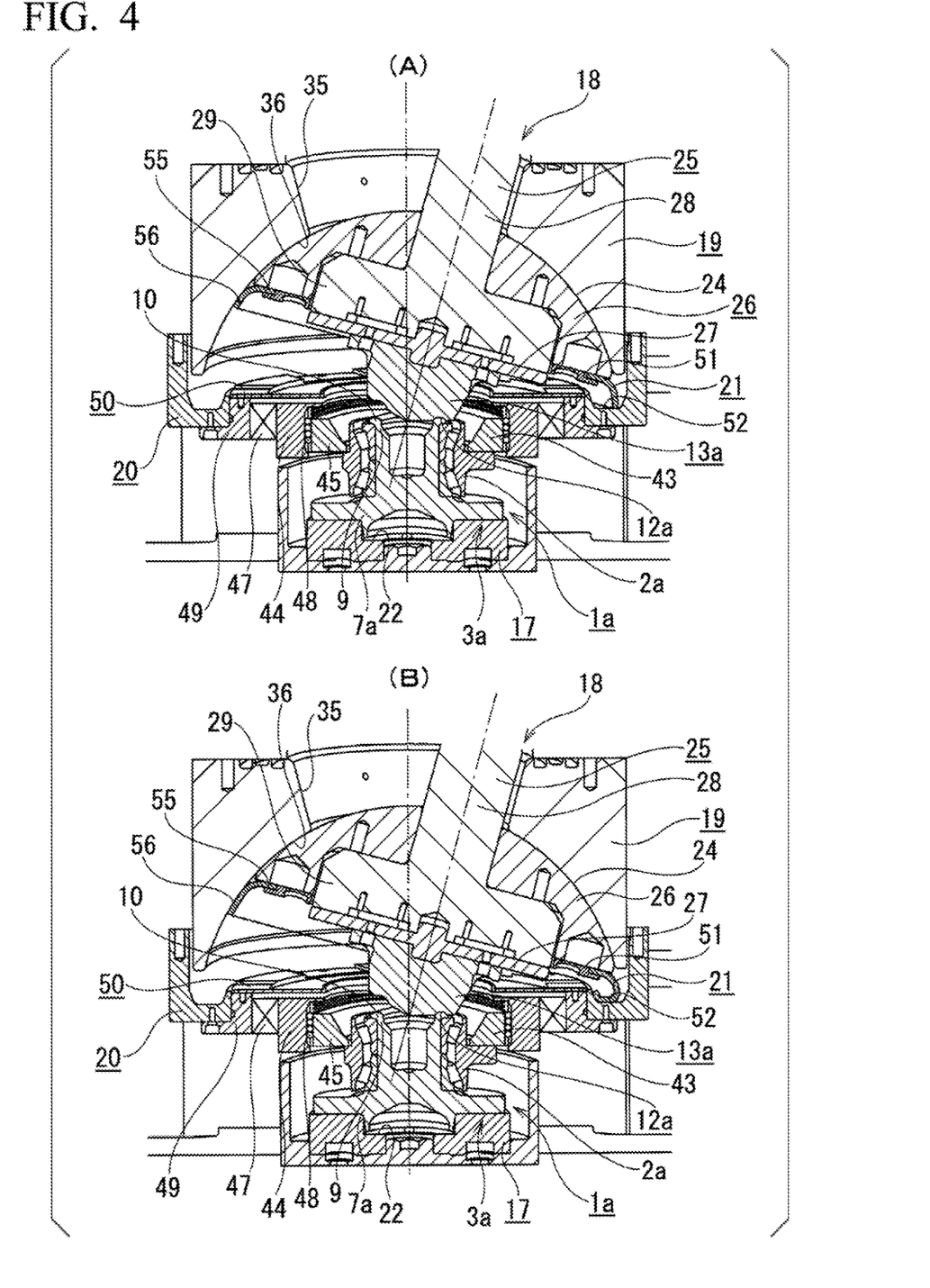
FIG. 4 is a view similar to FIG. 2 showing two other examples of a shape of a guide member.

In this example, although the outer circumferential surface of one axial end portion of a part of the tubular portion 56 in the circumferential direction is slidably brought into contact with the concave spherical portion 36, an amount of blocked lubricating oil can also be increased (blocking performance can be enhanced) by increasing an axial dimension of the tubular portion 56 and increasing a contact length (an contact area) with the concave spherical portion 36 as shown in FIGS. 4A and 4B. When the axial dimension of the tubular portion 56 is formed to be longer to a certain extent, the portion of the tubular portion 56 which is inclined downward is disposed in the annular recess portion 52 by the deformation of the tubular portion 56, as shown in FIG. 4B.

Further, in this example, the cover portion 57 of the cover ring 50 covers the upper end portions of the outer race rotating mechanism 43, the radial bearing 47, and the guide ring 49. Therefore, even when the lubricating oil which has leaked out from the outer circumferential surface of the sliding contact portion between the outer circumferential surface of the tubular portion 56 of the guide member 21 and the concave spherical portion 36 spreads around from the outer circumferential edge portion of the tubular portion 56 to the inner circumferential surface thereof and drops from the inner circumferential surface of the tubular portion 56, or the outer circumferential edge portion of the tubular portion 56 cannot sufficiently block the lubricating oil due to wear and deterioration, an adverse effect on the environment around the hub unit bearing 1a can be prevented.

In this example, although the case in which the caulking portion 10 is formed by plastically deforming the axially inner end portion of the hub main body 7a of the hub unit bearing 1a radially outward with the rotary forging device 15 has been described, the rotary machining device of the present invention is not limited thereto and can be used for a rotary forging process of various workpieces such as a hub unit bearing with a face spline at an axially inner end portion of a hub, a bevel gear, a ring-shaped members with a flange at an axial end portion thereof, or the like. The rotary machining device of the present invention can also be applied to devices which perform processing other than forging.

Second Example of Embodiment

FIG. 5 shows a second example of the embodiment of the present invention. In this example, rubber which is softer (lower in elastic coefficient) than the rubber forming the guide member 21 of the first example of the embodiment is used as rubber constituting a guide member 21a. Therefore, in a state in which an annular portion 55a of the guide member 21a is supported and fixed to the shaft-equipped spherical seat 18 via the support ring 51, a tubular portion 56a hangs downward from a radially outer end portion of the annular portion 55a.

In this example as described above, when the lubricating oil which has flowed out from the spherical engagement portion between the convex spherical portion 24 and the concave spherical portion 36 falls, the lubricating oil is received by the outer circumferential surface of the tubular portion 56a of the guide member 21a (the lubricating oil adheres to the outer circumferential surface of the tubular portion 56a). The lubricating oil dropped to the outer circumferential surface of the tubular portion 56a moves downward along the outer circumferential surface of the tubular portion 56a, drops from a tip end portion of the tubular portion 56a into the annular recess portion 52 of the oil receiver 20 or drops to the upper surface of the cover ring 50 and then flows into the annular recess portion 52. As a result, similarly to the rotary forging device 15 of the first example of the embodiment, it is possible to prevent the adverse effect on the environment around the hub unit bearing 1a.

In this example, since the tubular portion 56a of the guide member 21a is not in sliding contact with the concave spherical portion 36, the tubular portion 56a can be prevented from being worn or broken, and durability of the guide member 21a can be improved. The constitution and effects of the other parts are the same as in the first example of the embodiment.

Third Example of Embodiment

Figure 6:
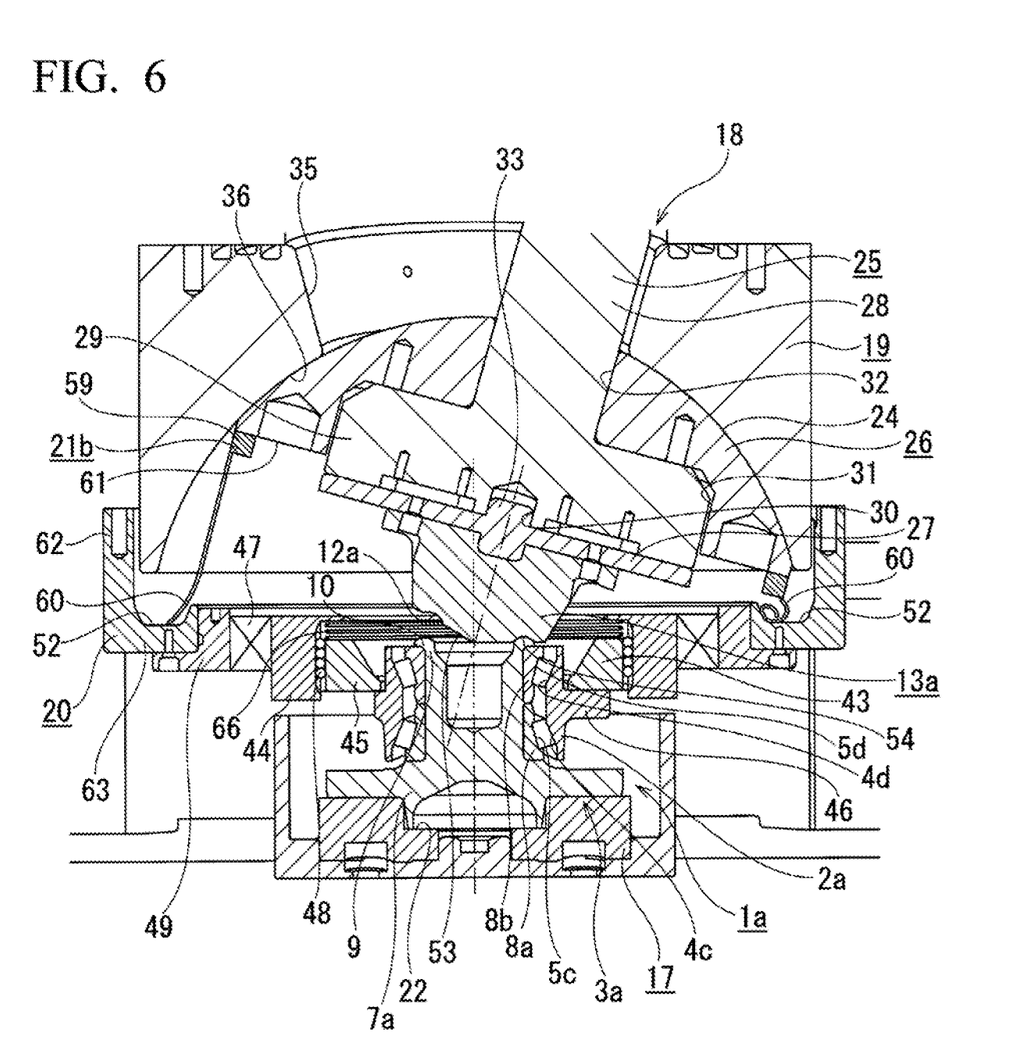
FIG. 6 is an enlarged cross-sectional view of a main part showing a rotary machining device (a rotary forging device) according to a third example of the embodiment of the present invention.

FIG. 6 shows a third example of the embodiment of the present invention. A guide member 21b of this example includes an annular seal portion 59 and a plurality of guide pieces 60. The seal portion 59 is adhered and supported over the entire circumference of a radially outer end portion of an end surface 61 which is a side surface of the convex spherical seat 26 of the shaft-equipped spherical seat 18 on one axial side. In this example, although an outer circumferential surface of the seal portion 59 is not in contact with the concave spherical portion 36, the outer circumferential surface of the seal portion 59 may be in sliding contact with the concave spherical portion 36 of the concave spherical seat 19. Further, in this example, the seal portion 59 is constituted by a gland packing having a rectangular shape in section.

The guide pieces 60 are formed of, for example, rubber or a synthetic resin and may be formed in a string shape or a band shape. The guide pieces 60 are provided to hang downward from a plurality of circumferential positions of the seal portion 59. A tip end portion (a lower end portion) of each of the guide pieces 60 is disposed in the annular recess portion 52 of the oil receiver 20. When each of the guide pieces 60 is in the form of a string, excessive deformation of the guide piece 60 may be prevented by a metallic core material.

In this example as described above, the lubricating oil which has flowed out from the outer circumferential edge portion of the spherical engagement portion between the convex spherical portion 24 and the concave spherical portion 36 moves to the guide pieces 60 via the outer circumferential surface of the seal portion 59 of the guide member 21b. The lubricating oil moved to the guide pieces 60 moves downward along the guide pieces 60 and is guided to the annular recess portion 52 of the oil receiver 20. The constitution and effects of the other parts are the same as in the first and second examples of the embodiment.

In one embodiment, the rotary machining device (15) includes a reference axis, a support jig (17), a shaft-equipped spherical seat 18, a concave spherical seat (19), an oil receiver (20), and a guide member (21; 21a; 21b). The support jig (17) serves to support a workpiece such that a central axis of the workpiece and the reference axis are coaxial with each other. The shaft-equipped spherical seat (18) includes a machining portion (12a) having a central axis inclined with respect to the reference axis and formed at one axial end portion, and a convex spherical portion (24) having a partially spherical shape, formed at an axially intermediate portion and facing the other axial end side. The concave spherical seat (19) includes an insertion hole (35) through which the other axial end portion (a portion of the shaft-equipped spherical seat located on the other axial end side of the convex spherical portion (24)) of the shaft-equipped spherical seat (18) is inserted, and a concave spherical portion (36) which spherically engages with the convex spherical portion (24). The oil receiver (20) has an annular recess portion (52) which faces the entire circumference of an outer circumferential edge of the concave spherical portion 36. The guide member (21; 21a; 21b) supports the other axial end portion (a base end portion) by a portion of the shaft-equipped spherical seat (18) on one axial end side and also serves to guide lubricating oil, which has flowed out from a spherical engagement portion between the convex spherical portion (24) and the concave spherical portion 36, toward the annular recess portion (52).

The guide member (21; 21a; 21b) may be formed in a tubular shape, an outer circumferential surface of one axial side portion (a tip end side portion) of a part of the guide member (21; 21a; 21b) in a circumferential direction is slidably brought into contact with the concave spherical portion 36, and one axial end edge (a tip end edge) of the remaining part of the guide member (21; 21a; 21b) may be caused to face an opening portion of the annular recess portion (52), or an axially intermediate portion or one end portion of the remaining part of the guide member (21; 21a; 21b) may be disposed in the annular recess portion (52).

Alternatively, the guide member (21; 21a; 21b) may be formed in a tubular shape, and the one axial side portion (the tip end side portion) of the guide member (21; 21a; 21b) may be formed to hang downward.

Alternatively, the shaft-equipped spherical seat (18) may have an end surface which faces one axial end side, and the guide member (21; 21a; 21b) may include an annular seal portion (59) supported by and fixed to the end surface, and string-shaped or band-shaped guide pieces (60) which hang down from a plurality of circumferential positions of the seal portion (59).

In one example, an annular cover plate (50) may be supported and fixed on the inside of an oil receiver (20) in a radial direction.

An inclination angle of a central axis of the shaft-equipped spherical seat (18) with respect to the reference axis may be 15 degrees or more.

In one aspect of the present invention, in the rotary machining device (15), the shaft-equipped spherical seat (18) may include a main body (25), a base plate (27), and pressing die (13a; 13b). The main body (25) has the central axis inclined with respect to the reference axis and the convex spherical portion (24). The base plate (27) has a holding recess portion (67) at a side surface on one axial end side and is coupled and fixed to a side surface of the main body (25) on one axial end side. The pressing die (13a; 13b) has a machining portion (12a) at one axial end portion thereof and is coupled and fixed to the base plate (27) in a state in which radial positioning with respect to the base plate (27) is achieved by internally fitting the other axial end into the holding recess portion (67) without rattling.

In one aspect of the present invention, a hub unit bearing (1a) to be manufactured through a method of manufacturing a hub unit bearing includes an outer race (2a) having double rows of outer race tracks on an inner circumferential surface thereof, a hub (3a) having double rows of inner race tracks on an outer circumferential surface thereof, and a plurality of rolling elements (6a) rollably disposed for each row between the double rows of outer race tracks and the double rows of inner race tracks. The hub (3a) includes inner races (8a and 8b) and a hub main body (7a). Each of the inner races (8a and 8b) has an inner race track on the inside in the axial direction, among the double rows of inner race tracks, on an outer circumferential surface thereof. The hub main body (7a) includes a race track on the axial outside, among the double rows of inner race tracks, which is provided directly or via another member on an outer circumferential surface of the axially intermediate portion, a fitting cylindrical portion (9) which is provided axially inward from the inner race track on the outside in the direction and on which the inner race is externally fitted, and a caulking portion (10) which is bent radially outward from an axially inner end portion of the fitting cylindrical portion (9) and presses an axially inner end surface of the inner race.

In the method of manufacturing a hub unit bearing according to the aspect of the present invention, the caulking portion (10) is formed by plastically deforming the cylindrical portion (9) provided at an axially inner end portion of the hub main body (7a) before formation of the caulking portion (10) radially outward using the above-described rotary machining device (15).

In one aspect of the present invention, a vehicle to be manufactured through a method of manufacturing a vehicle includes a hub unit bearing. In the method of manufacturing a vehicle, the hub unit bearing is manufactured through the method of manufacturing a hub unit bearing as described above.

REFERENCE SIGNS LIST

1a Hub unit bearing (workpiece, an object to be machined)
2a Outer race
3a Hub
4c, 4d Outer race track
5c, 5d Inner race track
6a Rolling element
7a Flub main body
8a, 8b Inner race
9 Cylindrical portion
10 Caulking portion
12a Machining portion
13a, 13b Pressing die (machining tool)
15 Rotary machining device (rotary forging device)
16 Frame
17 Support jig (support body)
18 Shaft-equipped spherical seat (swinging body)
19 Concave spherical seat
20 Oil receiver
21, 21a, 21b Guide member
22 Support recess portion
23 Lifting table
24 Convex spherical portion
25, 25a Shaft main body
26 Convex spherical seat
27 Base plate
28 Shaft portion
29, 29a Flange portion
30 First positioning recess portion
31 Fitting recess portion
32 Through hole
33 First positioning convex portion
34 Second positioning convex portion
35 Insertion hole
36 Concave spherical portion
37 Stepped hole
38 Drive mechanism
39 Rotation body
40 Bearing
41 Bearing device
42 Holding hole
43 Outer race rotating mechanism
44 Driving ring
45 Driving jig
46 Coupling flange
47 Radial bearing
48 Ball spline
49 Guide ring
50 Cover ring (cover plate)
51 Support ring
52 Annular recess portion
53 Protruding portion
54 Groove
55, 55a Annular portion
57 Cover portion
58 Return portion
59 Seal portion
60 Guide piece
61 End surface
62 Cylindrical portion
63 Annular portion
64 Second positioning recess portion
65 Inward flange portion
66 Torsion coil spring
67 Holding recess portion

The invention claimed is:

1. A rotary machining device comprising:
a reference axis;
a support jig which supports a workpiece such that a central axis of the workpiece and the reference axis are coaxial with each other;
a shaft-equipped spherical seat which includes a shaft main body, a pressing die having a central axis inclined with respect to the reference axis and formed at one axial end portion, and a convex spherical portion having a partially spherical shape facing upwards, the convex spherical portion being combined with the shaft main body;
a concave spherical seat including an insertion hole through which an axially intermediate portion of the shaft main body is inserted, and a concave spherical portion which spherically engages with the convex spherical portion;
an oil receiver having an annular recess portion which faces an entire circumference of an outer circumferential edge of the concave spherical portion;

a guide member which is configured to guide lubricating oil, which has flowed out from a spherical engagement portion between the convex spherical portion and the concave spherical portion, toward the annular recess portion, a base end portion of the guide member being supported by a lower side portion of the convex spherical portion; and an annular cover plate, supported and fixed on an inside of the oil receiver in a radial direction, wherein the cover plate has an annular cover portion and a return portion, the cover portion being inclined in a downward direction as the cover portion goes radially outward such that the lubricating oil, which falls on the cover portion, flows into the oil receiver, and the return portion being bent upward from a radially inner end portion of the cover portion.

2. The rotary machining device according to claim 1, wherein the guide member is formed in a tubular shape, an outer circumferential surface of one axial side portion of a part of the guide member in a circumferential direction is slidably brought into contact with the concave spherical portion, and one axial end edge of a remaining part of the guide member is caused to face an opening portion of the annular recess portion, or an axially intermediate portion or one end portion of the remaining part of the guide member is disposed in the annular recess portion.

3. The rotary machining device according to claim 1, wherein the guide member is formed in a tubular shape, and one axial side portion of the guide member is formed to hang downward.

4. The rotary machining device according to claim 1, wherein the shaft-equipped spherical seat has an end surface which faces downwards, and the guide member includes an annular seal portion supported by and fixed to the end surface, and string-shaped or band-shaped guide pieces which hang down from a plurality of circumferential positions of the seal portion.

5. The rotary machining device according to claim 1, wherein an inclination angle of a central axis of the shaft-equipped spherical seat with respect to the reference axis is 15 degrees or more.

6. The rotary machining device according to claim 1, wherein:
the shaft-equipped spherical seat includes a main body, a base plate, and the pressing die,
the main body has a central axis inclined with respect to the reference axis, and the convex spherical portion,
the base plate has a holding recess portion facing downwards and is coupled and fixed to a lower side of the main body, and
the pressing die is coupled and fixed to the base plate in a state in which radial positioning with respect to the base plate is achieved by internally fitting into the holding recess portion without rattling.

7. A method of manufacturing a hub unit bearing including an outer race having double rows of outer race tracks on an inner circumferential surface thereof, a hub having double rows of inner race tracks on an outer circumferential surface thereof, and a plurality of rolling elements rollably disposed for each row between the double rows of outer race tracks and the double rows of inner race tracks, wherein the hub includes an inner race and a hub main body, the first inner race has a first inner race track, among the double rows of inner race tracks, on an outer circumferential surface thereof, the hub main body includes a second inner race track, among the double rows of inner race tracks, which is provided directly or via another member on an outer circumferential surface of the axially intermediate portion, a fitting cylindrical portion which is provided axially inward from the first inner race track and on which the inner race is externally fitted, and a caulking portion which is bent radially outward from an axially inner end portion of the fitting cylindrical portion and presses an axially inner end surface of the inner race, wherein the caulking portion is formed by plastically deforming the cylindrical portion provided at an axially inner end portion of the hub main body before formation of the caulking portion radially outward using the rotary machining device according to claim 1.

8. A method of manufacturing a vehicle including a hub unit bearing, wherein the hub unit bearing is manufactured through the method of manufacturing a hub unit bearing according to claim 7.

* * * * *